(12) United States Patent
Crans et al.

(10) Patent No.: US 11,050,481 B2
(45) Date of Patent: Jun. 29, 2021

(54) SYSTEMS AND METHODS FOR CREATING WIRELESS AERIAL TRAFFIC CORRIDORS

(71) Applicant: Verizon Patent and Licensing Inc., Arlington, VA (US)

(72) Inventors: Joshua J. Crans, Bothell, WA (US); Fred Weisbrod, Renton, WA (US); Donna L. Polehn, Mercer Island, WA (US); Corey J. Christopherson, Bainbridge Island, WA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 21 days.

(21) Appl. No.: 16/696,036

(22) Filed: Nov. 26, 2019

(65) Prior Publication Data

US 2021/0159965 A1    May 27, 2021

(51) Int. Cl.
| | |
|---|---|
| *H04B 1/18* | (2006.01) |
| *H04B 7/08* | (2006.01) |
| *G08G 5/00* | (2006.01) |
| *H04B 7/024* | (2017.01) |
| *B64C 39/02* | (2006.01) |

(52) U.S. Cl.
CPC ......... *H04B 7/0808* (2013.01); *B64C 39/024* (2013.01); *G08G 5/0013* (2013.01); *G08G 5/0034* (2013.01); *G08G 5/0039* (2013.01); *G08G 5/0069* (2013.01); *H04B 7/024* (2013.01)

(58) Field of Classification Search
CPC .. H04B 7/0808; H04B 7/024; H04B 7/18504; H04B 17/318; B64C 39/024; G08G 5/0013; G08G 5/0034; G08G 5/0039; G08G 5/0069; H02J 7/025; H04W 64/00; H04W 36/40; H04W 36/12; H04W 4/40; B62C 39/024; G05D 1/104; B64D 1/22; G01C 21/16; G01C 21/20
USPC ...................................................... 455/277.2
See application file for complete search history.

(56) References Cited

U.S. PATENT DOCUMENTS

| | | | | |
|---|---|---|---|---|
| 7,469,183 | B2* | 12/2008 | Bodin ................ | G05D 1/0027 701/23 |
| 9,110,170 | B1* | 8/2015 | Woollard ............ | G01S 13/89 |
| 9,792,613 | B2* | 10/2017 | Gong ................ | G06Q 30/018 |
| 2017/0069214 | A1* | 3/2017 | Dupray ............. | G08G 5/0013 |
| 2018/0004207 | A1* | 1/2018 | Michini ........... | G08G 5/0069 |
| 2018/0091908 | A1* | 3/2018 | Goel ................. | G08G 5/0069 |
| 2018/0157255 | A1* | 6/2018 | Halverson ........ | B64C 39/024 |

(Continued)

*Primary Examiner* — Phuoc H Doan

(57) ABSTRACT

A device may receive information indicating one or more parameters associated with one or more antenna arrays in a radio access network. The device may receive a flight request that indicates one or more conditions for a flight path of an unmanned aerial vehicle (UAV) seeking network access to the radio access network. The device may determine waypoints for the flight path based on analyzing the one or more parameters associated with the one or more antenna arrays and the one or more conditions for the flight path of the UAV. The device may transmit information identifying the waypoints for the flight path. The device may send control information to cause the one or more antenna arrays to form a corresponding one or more beams along the flight path to enable the UAV to traverse the flight path with the network access to the radio access network.

20 Claims, 11 Drawing Sheets

(56) References Cited

U.S. PATENT DOCUMENTS

2019/0081673 A1* 3/2019 Athley ................... H04B 7/088
2020/0211402 A1* 7/2020 Parron ................. G08G 5/0021

* cited by examiner

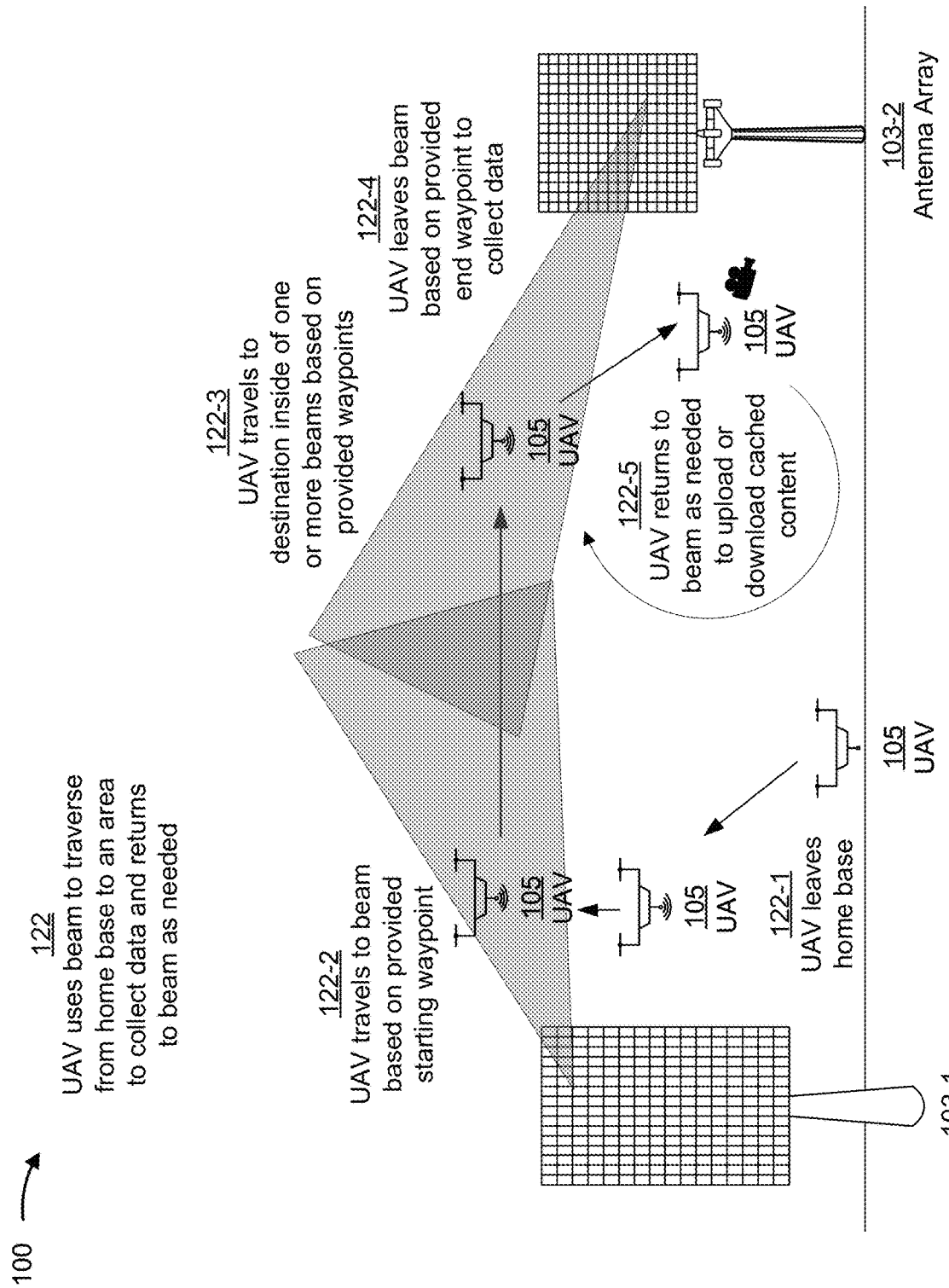

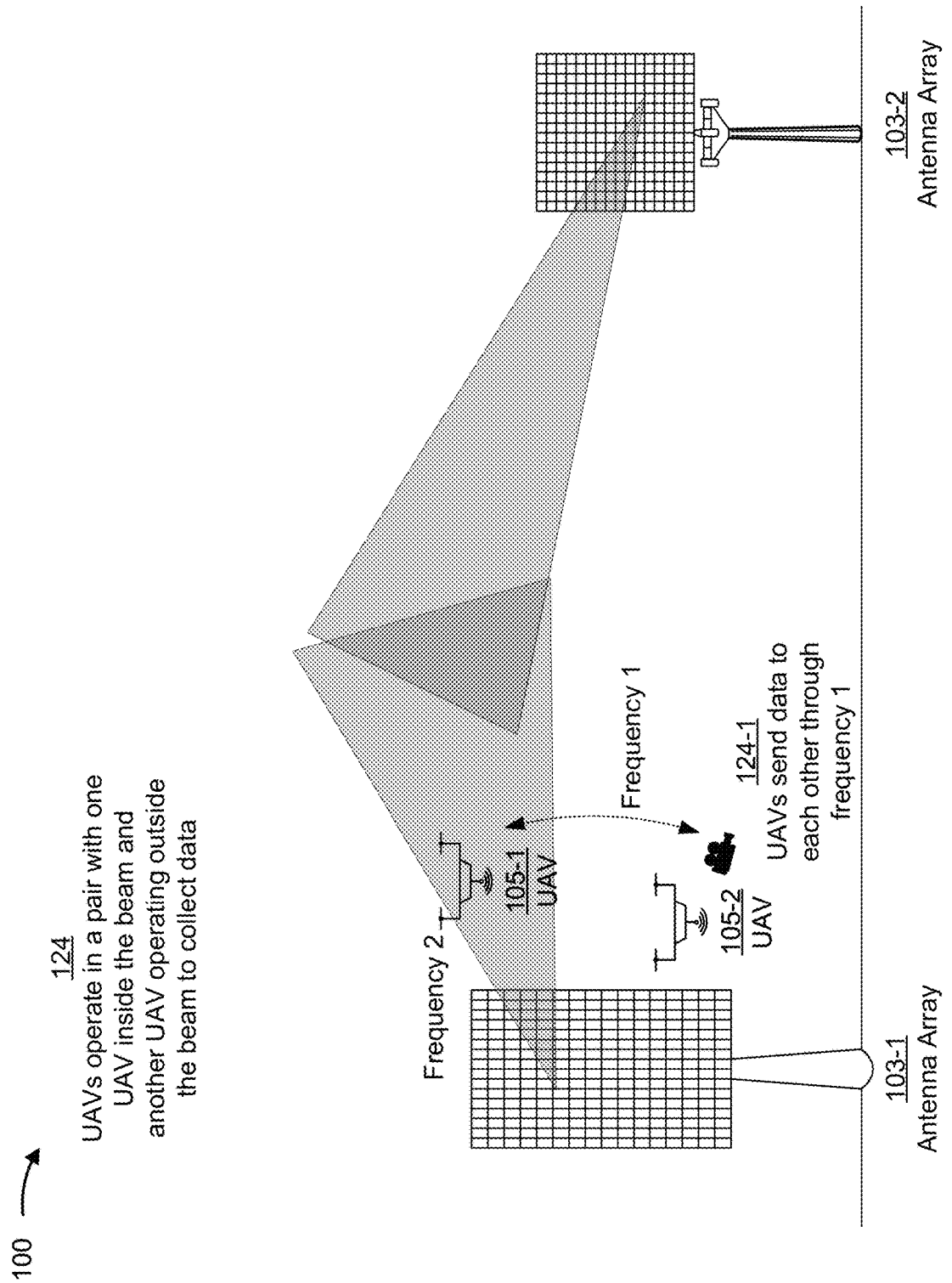

SYSTEMS AND METHODS FOR CREATING WIRELESS AERIAL TRAFFIC CORRIDORS

BACKGROUND

An unmanned aerial vehicle (UAV) is a machine capable of flight without a human pilot on board. UAVs may be operated through various means, such as by remote control, autonomously through onboard computers, and/or the like. UAVs have applications in a variety of fields, such as military, scientific, recreational, or commercial sectors.

BRIEF DESCRIPTION OF THE DRAWINGS

FIGS. 1A-1H are diagrams of one or more example implementations described herein.

DETAILED DESCRIPTION OF PREFERRED EMBODIMENTS

Figure 1A:
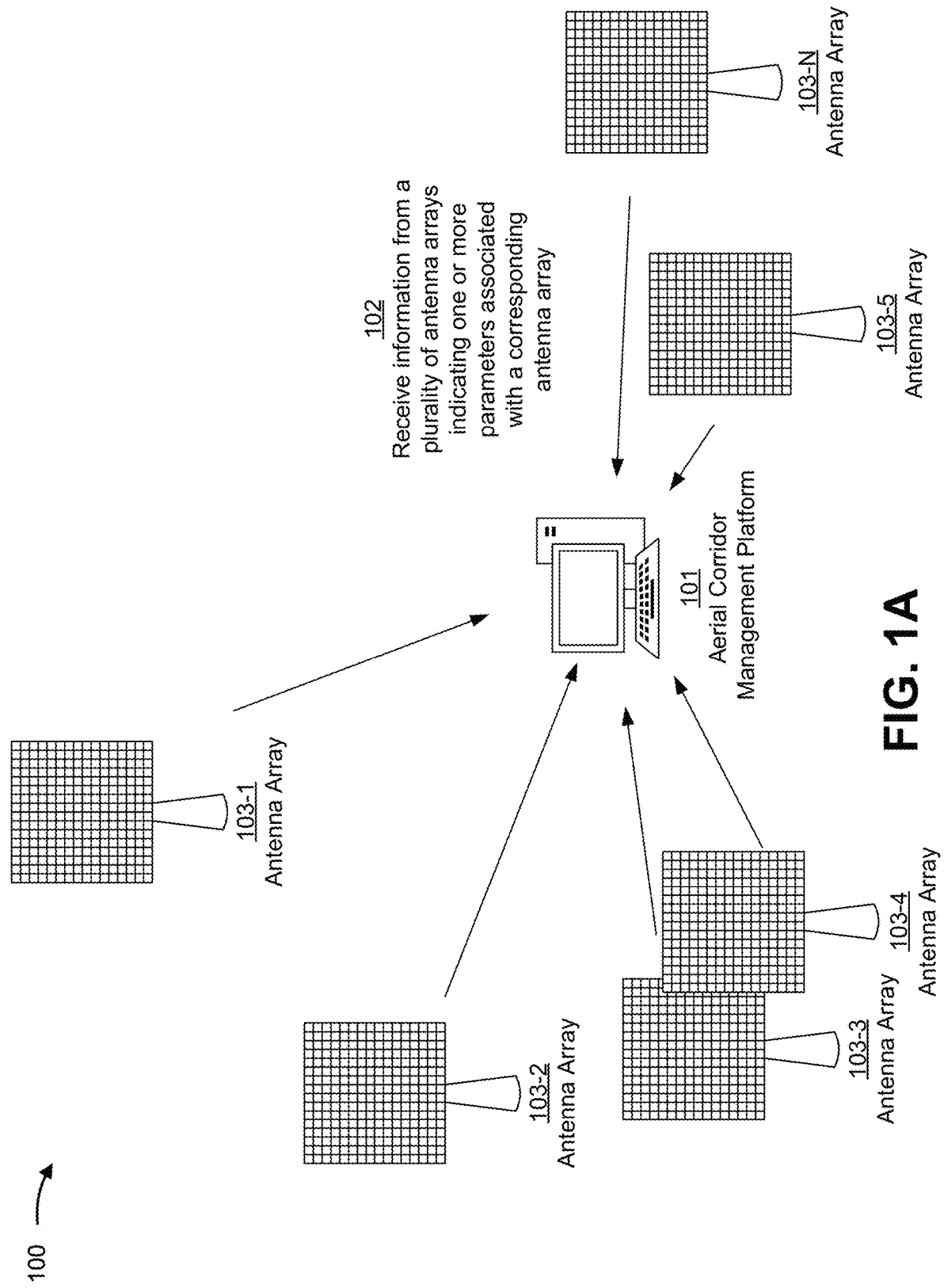

The following detailed description of example implementations refers to the accompanying drawings. The same reference numbers in different drawings may identify the same or similar elements.

Advances in technology have allowed unmanned aerial vehicles (UAVs) to become increasingly integrated into research and commercial practices. For example, researchers may rely on UAVs for data collection, such as capturing photographs or video, of areas or features difficult to reach by humans or terrain-based methods. In addition, commercial suppliers may use UAVs for delivery of food, books, newspapers, and other commercial goods to consumers.

UAVs may need a consistent connection to wireless communication networks for usability purposes, such as to allow remote control, to allow for transmittal of data to and from a server, to allow for proper navigation, and/or the like. However, current wireless communication networks and communication standards are tailored towards terrestrial devices, such as mobile devices (e.g., smart phones, tablets, smart watches, and/or the like), which do not frequently leave the ground. For example, current wireless communication standards enable a mobile device to maintain a strong wireless connection by having the mobile device switch to a signal with the strongest gain. On land, the nature of where the base stations are located may typically allow a mobile device to detect two to three signals and communication protocols allow the mobile device to efficiently switch to the strongest of these signals. However, in the air, UAVs may detect a much greater number of signals, such as twenty or more signals, resulting in inefficiencies for the UAV to choose a clear high gain signal over another. In addition, the signals are not typically directed towards the air and are much weaker than for terrestrial mobile devices. This causes problems with UAVs maintaining a consistent signal, which in turn wastes computing resources of the UAV related to finding a proper signal and recovering data due to a lost signal. UAVs may waste computing resources due to frequent switching of signals because the lack of one clear signal over another.

Additionally, surveillance devices, such as international mobile subscriber identity (IMSI) catchers or stingrays, may cause security concerns by mimicking base stations or cell sites to force mobile devices to establish connections with an unauthorized surveillance devices. Since a common protocol of cellular communications causes mobile devices to connect to the cell site offering the strongest signal, surveillance devices may easily spoof existing known cell sites and cause mobile devices to connect to the unauthorized surveillance devices and download private data.

Some implementations described herein provide an aerial corridor management platform that is capable of allowing a UAV to submit a flight request and create flight corridors through beamforming antenna arrays via a series of waypoints that provide a consistent communication signal for the UAV throughout a flight path. In this way, the aerial corridor management platform may provide wireless coverage for the UAV over a duration of the flight path of the UAV through focused beams that are not intended to interfere with any ground traffic. This may preserve computing resources that would otherwise have been used in recovering data due to the UAV losing a wireless connection needed to transmit the data. In addition, this may preserve computing resources that would otherwise have been used in finding the best signal, because the beams emit a clear signal for the UAV to use for some or all of the flight path.

The aerial corridor management platform may provide a dynamic system of beams by selectively activating and/or inactivating beams and/or by controlling the antenna arrays to create dynamic beams that sweep an area relating to the flight path of a UAV. The dynamic nature of the beams may allow for a more secure connection because the dynamic nature of the beams may be difficult to spoof and may create difficulty for a malicious actor to predict where a beam will be emitted. Whereas typical cell sites usually emit a signal statically in predictable locations, the dynamic beams, that may be formed and changed as a function of time, are much more difficult to predict. This creates difficulties for surveillance devices, such as IMSI catchers and stingrays, to mimic the behavior of the antenna arrays. In turn, this improves security and saves computing resources (e.g., processor resources, memory resources, communication resources, and/or the like) that would otherwise have been used in attempting to identify, diagnose, and remedy security threats caused by cell site spoofing. For example, computing resources that may otherwise have been used in executing additional processes to identify a cause of the security breach may no longer be used, because of the reduction or elimination of security breaches.

FIGS. 1A-1H are diagrams of one or more example implementations 100 described herein. As shown in FIGS. 1A-1H, example implementation(s) 100 may include an aerial corridor management platform 101, a plurality of antenna arrays 103, a UAV 105, a user device 107 capable of controlling the UAV, and a controller device 109 capable of communicating with the plurality of antenna arrays 103. While FIGS. 1A-1H show a single aerial corridor management platform 101, a single UAV 105, a single user device 107, and a single controller device 109, in practice, there may be a plurality of aerial corridor management platforms, a plurality of UAVs, a plurality of user devices, and/or a plurality of controller devices. For example, a single aerial corridor management platform may interact with a plurality of UAVs, a plurality of user devices, a plurality of controller devices, and/or a plurality of antenna arrays. Additionally, or alternatively, a single UAV and/or a single antenna array may interact with a plurality of aerial corridor management platforms.

As shown in FIG. 1A, and by reference number 102, the aerial corridor management platform 101 may receive information from an antenna array indicating one or more parameters associated with the antenna array. The aerial corridor management platform 101 may receive multiple sets of one or more parameters from different antenna arrays—that is, a first antenna array may send information indicating one or more parameters of the first antenna array, a second antenna array may send information indicating one or more parameters of the second antenna array, and so on.

The one or more parameters may include various information indicating physical attributes of the antenna array, the ability of the antenna array to form beams that enable network connectivity, and/or the like. For example, the one or more parameters may include information identifying a geographic location of an antenna array, such as location coordinates, information identifying an altitude of the antenna array, and/or the like. In some implementations, the one or more parameters may include information regarding physical attributes of the antenna array, such as a size of the antenna array, an orientation of the antenna array, an angle of the antenna array, and/or the like. Additionally, or alternatively, the one or more parameters may include information regarding a beam that may be produced by the antenna array such as a power of a signal capable of being output by the antenna array. In some implementations, the one or more parameters may include information regarding characteristics of a beam that may be produced by the antenna array, such as an azimuth, a tilt, current and future positioning, a size, and a variance of the beam that may be produced by the antenna array. In some implementations, the one or more parameters may include information regarding a current status of the antenna array, such as whether the antenna array is active (e.g., currently producing a beam for another UAV, currently using all available beams, and/or the like) and/or inactive (e.g., not currently producing a beam for another UAV, not currently using all available beams, and/or the like). In practice, the one or more parameters may include any single one of the parameters described above, any combination of the parameters described above, a different parameter, relating to the antenna array, than the parameters described above, and/or the like.

The aerial corridor management platform 101 may process and store the information regarding the antenna arrays and the corresponding one or more parameters of each antenna array. Through this, the aerial corridor management platform 101 may determine which antenna arrays may be best suited to form beams to allow a UAV 105 to traverse a distance along the beams and maintain a consistent network connection. For example, the aerial corridor management platform 101 may use one or more algorithms to evaluate which antenna arrays may be best suited to form the beams to allow the UAV 105 to traverse the flight path based on different factors, such as overall load on a system, overall resource allocation on the system, and/or the like. When a UAV 105 submits a flight request to the aerial corridor management platform 101, the aerial corridor management platform 101 has a foundation from which to determine a flight path with consistent network coverage.

Figure 1B:
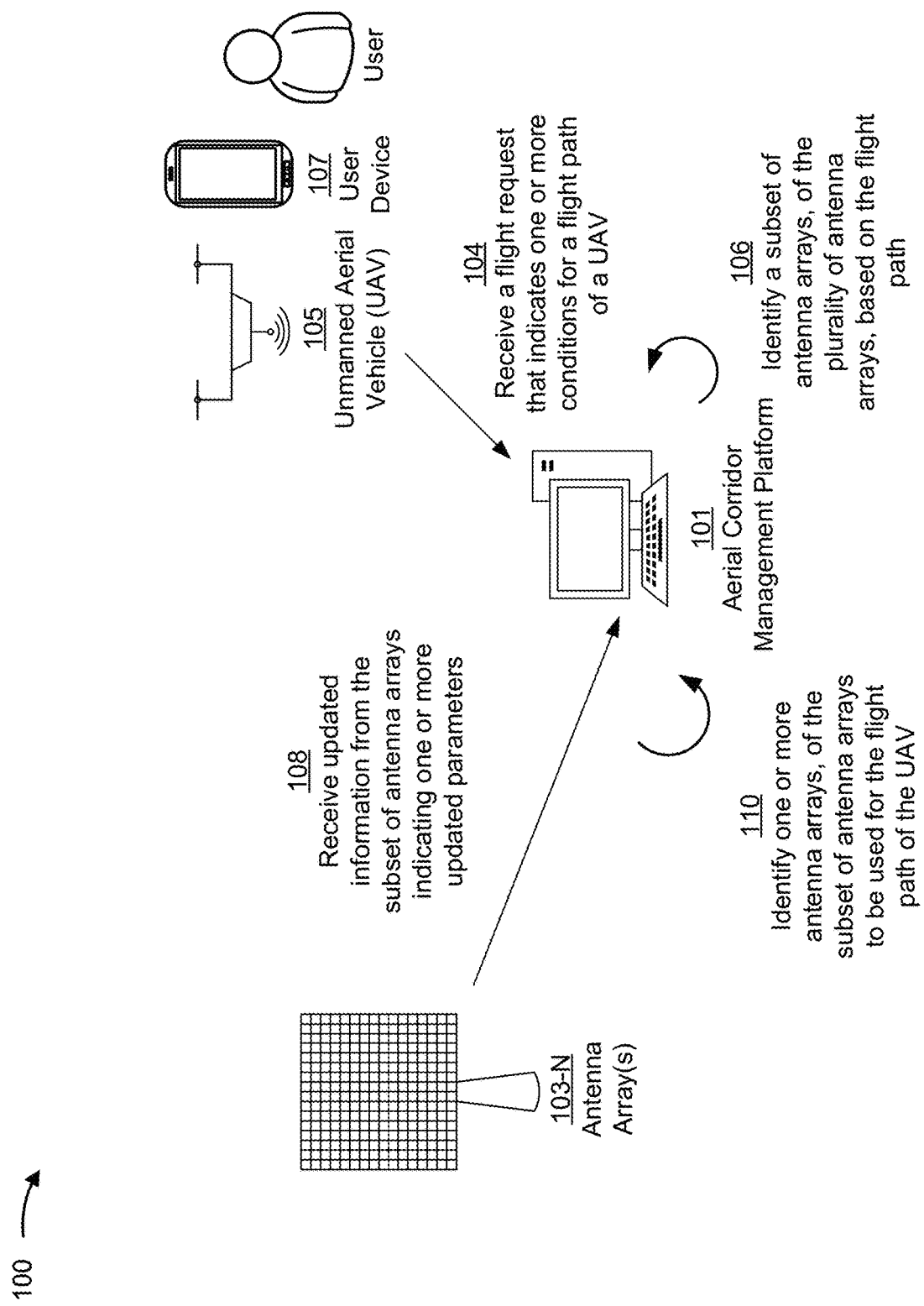

As shown in FIG. 1B, and by reference number 104, the aerial corridor management platform 101 may receive a flight request that indicates one or more conditions for a flight path of a UAV 105. In this way, the aerial corridor management platform 101 may determine an optimal flight path for the UAV 105 that satisfies the one or more conditions. In some implementations, the aerial corridor management platform 101 may receive the flight request from the UAV 105. In some implementations, the aerial corridor management platform 101 may receive the flight request from the user device 107 associated with the UAV 105.

The one or more conditions may relate to a service to be provided by the UAV 105. UAVs may request various different conditions depending on the service to provided. For example, a UAV 105 to be remote controlled may request a consistent network connection throughout the duration of the flight path, a UAV 105 that is paired to another device may request a network connection only at particular segments of the flight path, a UAV 105 that collects and transmits video may request a strong network connection, and/or the like.

The one or more conditions may include conditions that, if met, enable the UAV 105 to provide the service. For example, the one or more conditions may include information relating to a type or strength of signal or network access needed. For example, the one or more conditions may indicate a minimum signal-to-interference-plus-noise ratio (SINR) for network access, a minimum desired throughput for the network access to the radio access network, a minimum quality of service for the network access, a minimum amount of jitter that would be acceptable for the network access, and/or the like. Additionally, or alternatively, the one or more conditions may identify conditions pertaining to the flight path, such as information identifying a start location for the flight path, information identifying an end location for the flight path, a minimum altitude associated with the flight path, a maximum altitude associated with the flight path, on which segments of the flight path network access is needed, weather conditions, and/or the like.

In some implementations, the one or more conditions may include information identifying conditions of the UAV 105, such as a maximum route distance that the UAV 105 is capable of travelling, an energy expenditure preference of the UAV 105, and/or the like. In some implementations, the UAV 105 may provide a description of the service to be provided, and the UAV 105 may determine additional conditions based on the service to be provided. In some implementations, the aerial corridor management platform 101 may use artificial intelligence techniques, such as machine learning, deep learning, and/or the like to determine any additional conditions to associate with a flight request. For example, the aerial corridor management platform 101 may use a machine learning model, such as a flight conditions model, to determine which additional conditions may be preferred or required. For example, the aerial corridor management platform 101 may train the flight conditions model to identify particular characteristics of a service to be provided by the UAV 105 that share attributes with particular conditions required for the service to be successfully provided by the UAV 105 (e.g., flight conditions) and establish a cluster (e.g., using a mapping, index, and/or the like) of the particular flight conditions. The aerial corridor management platform 101 may use a clustering algorithm (e.g., a K-means clustering algorithm, a hierarchical clustering algorithm, a density-based scan clustering with noise (DBSCAN) algorithm, a Gaussian clustering model, etc.), or a combination of different clustering algorithms to form the flight conditions clusters. The aerial corridor management platform 101 may train the flight conditions model using historical data associated with services and flight conditions. For example, the machine learning model may be trained based on historical service data (e.g., services to be provided by the UAV 105) and flight conditions and the trained model may then be used to determine the additional conditions needed for the UAV 105 to successfully provide the service.

In practice, the one or more conditions may include any single one of the conditions described herein, any combination of the conditions described herein, a different condition, relating to the UAV 105, than the conditions described herein, and/or the like. In some cases, the UAV 105 may send information classifying the one or more conditions, such as indicating which of the one or more conditions are required conditions, preferred conditions, unnecessary conditions, and/or the like. The information classifying the one or more conditions may affect a determination of waypoints for the flight path of the UAV 105.

As shown in FIG. 1B, and by reference number 106, the aerial corridor management platform 101 may identify a subset of antenna arrays, of the plurality of antenna arrays 103, based on the flight path and/or the one or more conditions for the flight path. For example, the aerial corridor management platform 101 may identify antenna arrays that are located within a particular geographic distance of the start location and/or the end location of the flight path and/or antenna arrays that are capable of satisfying the one or more conditions of the flight path. This may allow the aerial corridor management platform 101 to request updated information from a particular subset of antenna arrays that are candidates to be used for the flight path.

In some implementations, the aerial corridor management platform 101 may use artificial intelligence, such as machine learning, to identify the subset of antenna arrays based on the flight path and/or the one or more conditions for the flight path. The aerial corridor management platform 101 may obtain a first model for use in determining the subset of antenna arrays. For example, the aerial corridor management platform 101 may train the first model using historical information, such as historical information regarding one or more flight paths, historical information regarding one or more conditions for the one or more flight path, historical information regarding which antenna arrays were used for the one or more flight paths, and/or the like. In some implementations, when generating the first model, the aerial corridor management platform 101 may perform a data preprocessing operation. In this way, the aerial corridor management platform 101 may organize thousands, millions, or billions of data items for machine learning and model generation, which may result in a more accurate model.

In some implementations, the aerial corridor management platform 101 may perform a training operation when generating the first model. For example, the aerial corridor management platform 101 may portion the historical information into a training set (e.g., a set of information to train the first model), a validation set (e.g., a set of information used to evaluate a fit of the first model and/or to fine tune the first model), a test set (e.g., a set of information used to evaluate a final fit of the first model), and/or the like. In some implementations, the aerial corridor management platform 101 may preprocess and/or perform dimensionality reduction to reduce the historical information to a minimum feature set. In some implementations, the aerial corridor management platform 101 may train the first model on this minimum feature set, thereby reducing processing to train the first model, and may apply a classification technique, to the minimum feature set.

In some implementations, the aerial corridor management platform 101 may use a classification technique, such as a logistic regression classification technique, a random forest classification technique, a gradient boosting machine learning (GBM) technique, and/or the like, to determine a score (e.g., a probability that an antenna array is capable of fulfilling the one or more conditions for a flight path). Additionally, or alternatively, the aerial corridor management platform 101 may use a naïve Bayesian classifier technique. In this case, the aerial corridor management platform 101 may perform binary recursive partitioning to split the historical information of the minimum feature set into partitions and/or branches and use the partitions and/or branches to perform predictions (e.g., that a particular antenna array is suitable for fulfilling the one or more conditions for the flight path). Based on using recursive partitioning, the aerial corridor management platform 101 may reduce utilization of computing resources relative to manual, literal sorting and analysis of data items, thereby enabling use of thousands, millions, or billions of data items to train the first model, which may result in a more accurate model than using fewer data items.

Additionally, or alternatively, the aerial corridor management platform 101 may train the first model using a supervised training procedure that includes receiving input to the first model from a subject matter expert, which may reduce an amount of time, an amount of processing resources, and/or the like to train the first model relative to an unsupervised training procedure. In some implementations, the aerial corridor management platform 101 may use one or more other model training techniques, such as a neural network technique, a latent semantic indexing technique, and/or the like. For example, the aerial corridor management platform 101 may perform an artificial neural network processing technique (e.g., using a two-layer feedforward neural network architecture, a three-layer feedforward neural network architecture, and/or the like) to perform pattern recognition with regard to patterns of whether certain antenna arrays were successful or not successful in fulfilling one or more conditions of the flight path. In this case, using the artificial neural network processing technique may improve an accuracy of the first model by being more robust to noisy, imprecise, or incomplete data, and by enabling the aerial corridor management platform 101 to detect patterns and/or trends undetectable to human analysts or systems using less complex techniques.

In some implementations, a different device, such as a server device, may generate and train the first model. The different device may send the first model for use by the aerial corridor management platform 101. The different device may update and send (e.g., on a scheduled basis, on an on-demand basis, on a triggered basis, on a periodic basis, and/or the like) the first model to the aerial corridor management platform 101.

Accordingly, the aerial corridor management platform 101 may use any number of artificial intelligence techniques, machine learning techniques, deep learning techniques, and/or the like to identify the subset of antenna arrays.

As shown in FIG. 1B, and by reference number 108, the aerial corridor management platform 101 may receive updated information from the subset of antenna arrays indicating one or more updated parameters. The aerial corridor management platform 101 may send a request to an antenna array, of the subset of antenna arrays, or a controller device 109 associated with the subset of antenna arrays to request updated information. The aerial corridor management platform 101 may request updated information indicating particular parameters that may be more susceptible to change. For example, the aerial corridor management platform 101 may receive updated information from an antenna array indicating that the antenna array is active or inactive, a change to a prior status, and/or the like. In this way, the aerial corridor management platform 101 may have accurate information of which antenna arrays may be best suited to create beams and enable network access along the flight path of the UAV 105. The aerial corridor management platform 101 may store the updated parameters in a data structure where the original one or more parameters were stored.

As shown in FIG. 1B, and by reference number 110, the aerial corridor management platform 101 may identify one or more antenna arrays, of the subset of antenna arrays, to be used for the flight path of the UAV 105 based on receiving the updated information from the subset of antenna arrays. For example, if the updated information shows that an antenna array may not fulfill the one or more conditions for the flight path of the UAV 105, the aerial corridor management platform 101 may eliminate the antenna array from consideration for the one or more antenna arrays to be used for the flight path of the UAV 105.

In some implementations, the aerial corridor management platform 101 may use artificial intelligence, such as machine learning, to identify the one or more antenna arrays, of the subset of antenna arrays, to be used to enable network access for the UAV 105 during the flight path. The aerial corridor management platform 101 may obtain a second model for use in determining the one or more antenna arrays. For example, the aerial corridor management platform 101 may train the second model using historical information, such as historical information regarding one or more flight paths, historical information regarding one or more conditions for the one or more flight paths, historical information regarding which antenna arrays were used for the one or more flight paths, and/or the like. In some implementations, when generating the second model, the aerial corridor management platform 101 may perform a data preprocessing operation. In this way, the aerial corridor management platform 101 may organize thousands, millions, or billions of data items for machine learning and model generation, which may improve the accuracy of the second model.

In some implementations, the aerial corridor management platform 101 may perform a training operation when generating the second model. For example, the aerial corridor management platform 101 may portion the historical information into a training set (e.g., a set of information to train the first model), a validation set (e.g., a set of information used to evaluate a fit of the first model and/or to fine tune the first model), a test set (e.g., a set of information used to evaluate a final fit of the first model), and/or the like. In some implementations, the aerial corridor management platform 101 may preprocess and/or perform dimensionality reduction to reduce the historical information to a minimum feature set. In some implementations, the aerial corridor management platform 101 may train the second model on this minimum feature set, thereby reducing processing to train the second model, and may apply a classification technique, to the minimum feature set.

In some implementations, the aerial corridor management platform 101 may use a classification technique, such as described above to determine a score (e.g., a probability that an antenna array is capable of fulfilling the one or more conditions for a flight path). Additionally, or alternatively, the aerial corridor management platform 101 may train the second model using a supervised training procedure that includes receiving input to the second model from a subject matter expert, which may reduce an amount of time, an amount of processing resources, and/or the like to train the second model relative to an unsupervised training procedure. In some implementations, the aerial corridor management platform 101 may use one or more other model training techniques, such as a neural network technique, a latent semantic indexing technique, and/or the like. For example, the aerial corridor management platform 101 may perform an artificial neural network processing technique (e.g., using a two-layer feedforward neural network architecture, a three-layer feedforward neural network architecture, and/or the like) to perform pattern recognition with regard to patterns of whether certain antenna arrays were successful or not successful in fulfilling one or more conditions of the flight path. In this case, using the artificial neural network processing technique may improve an accuracy of the second model by being more robust to noisy, imprecise, or incomplete data, and by enabling the aerial corridor management platform 101 to detect patterns and/or trends undetectable to human analysts or systems using less complex techniques.

In some implementations, a different device, such as a server device, may generate and train the second model. The different device may send the second model for use by the aerial corridor management platform 101. The different device may update and send (e.g., on a scheduled basis, on an on-demand basis, on a triggered basis, on a periodic basis, and/or the like) the second model to the aerial corridor management platform 101.

Accordingly, the aerial corridor management platform 101 may use any number of artificial intelligence techniques, machine learning techniques, deep learning techniques, and/or the like to identify the one or more antenna arrays to be used for the flight path.

Figure 1C:
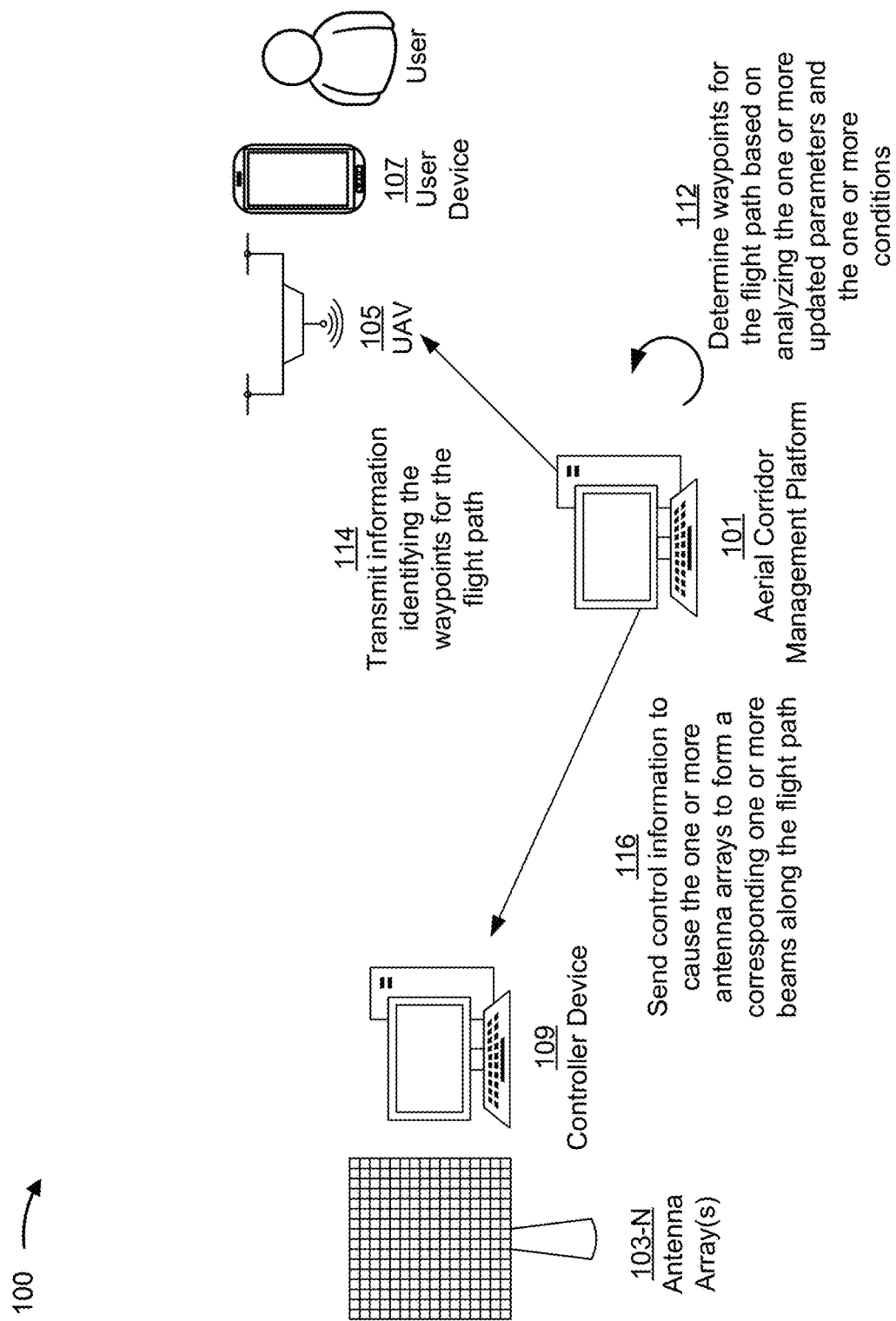

As shown in FIG. 1C, and by reference number 112, the aerial corridor management platform 101 may determine waypoints for the flight path based on analyzing the one or more updated parameters and the one or more conditions. The waypoints may include information identifying a latitude, longitude, altitude, and/or the like of points to where the UAV 105 is to be directed along the flight path to maintain network access. The aerial corridor management platform 101 may use a Geographic Information System (GIS) search algorithm, such as geohash, and/or the like, to determine the waypoints for the flight path.

In some implementations, the aerial corridor management platform 101 may determine a list of available applicable waypoints that fulfill the one or more updated parameters and the one or more conditions. In some implementations, the aerial corridor management platform 101 may be unable to determine waypoints for the flight path that satisfy all of the one or more conditions for the flight path. In this case, the aerial corridor management platform 101 may determine which of the one or more conditions are least likely to affect the UAV 105's ability to perform the service and determine a set of waypoints that satisfy a partial list of the one or more conditions for the flight path. In some implementations, the aerial corridor management platform 101 may use artificial intelligence, such as machine learning, to determine which of the one or more conditions may be necessary, or unnecessary, for the flight path or the service the UAV 105 is to offer based on analyzing the one or more conditions for the flight path. Additionally, or alternatively, the aerial corridor management platform 101 may use information received that classifies a condition, of the one or more conditions (e.g., whether the conditions is necessary, unnecessary, recommended, and/or the like), to determine which of the one or more conditions are least likely to affect the UAV 105's ability to perform the service.

In some implementations, the aerial corridor management platform 101 may attempt to determine waypoints by assuming the antenna arrays may form only static beams, or fixed beams. For example, an antenna array may form a beam that does not vary in angle, distance, height, or another variable while the beam is active. If using a static beam does not meet the one or more conditions for the flight path, the aerial corridor management platform 101 may instruct the antenna array to use a dynamic beam system, in which the antenna array is configured to create a beam that dynamically moves with the flight path of the UAV 105. Whether an antenna beam is capable of providing a static beam or a dynamic beam may be a parameter of the one or more parameters reported by the antenna array to the aerial corridor management platform 101.

As shown in FIG. 1C, and by reference number 114, the aerial corridor management platform 101 may transmit information identifying the waypoints for the flight path to the UAV 105 or the user device 107 associated with the UAV 105. In this way, the UAV 105 may obtain navigation information for the flight path to allow the UAV 105 to maintain consistent network connection throughout the duration of the flight path. The aerial corridor management platform 101 may transmit the information identifying the waypoints to other devices, such as a controller device 109 associated with the antenna arrays. In some implementations, the aerial corridor management platform 101 may store the information identifying the waypoints. The aerial corridor management platform 101 may easily determine future waypoints for future flight paths with similar conditions to a previous flight path. In this way, the aerial corridor management platform 101 may conserve computing resources associated with determining waypoints by reusing previously stored information rather than processing new information.

If the one or more conditions are not fulfilled by the waypoints, the aerial corridor management platform 101 may transmit additional information to the UAV 105 or the user device 107 associated with the UAV 105. For example, the aerial corridor management platform 101 may transmit a notification that a condition, of the one or more conditions, was not satisfied, transmit a request to accept or reject a set of waypoints for the flight path without all of the one or more conditions being satisfied, and/or the like. The aerial corridor management platform 101 may receive a response to the request to accept or reject a set of waypoints and perform one or more actions based on the response to the request. For example, the aerial corridor management platform 101 may determine another set of waypoints based on receiving a response to reject the previous set of waypoints.

As shown in FIG. 1C, and by reference number 116, the aerial corridor management platform 101 may send control information to cause the one or more antenna arrays to form a corresponding one or more beams along the flight path. The antenna arrays may form aerial corridors that enable network access to devices within the corridor by using high gain, narrow beams. Therefore, aerial devices, such as UAVs, that travel through the one or more beams may obtain network access, while terrestrial devices do not detect the one or more beams. In this way, aerial traffic may be isolated from terrestrial traffic, therefore reducing uplink interference and allowing efficient management and optimization of aerial traffic. The control information may include instructions to vary a height of a beam, vary a sweep of a beam, vary an angle of a beam, vary a width of a beam, vary a strength of a beam, vary a duration that a beam is active, and/or the like. In some implementations, the control information may include instructions to create dynamic beams, by varying attributes of the beam with time, such that an antenna array will move a beam along the flight path of the UAV 105. Where two or more beams may cover an overlapping area in the flight path, the control information may include instructions to turn off a first beam when the UAV 105 has traversed a distance such that the signal falls below a specified performance limit, while a second beam is created so the UAV 105 can traverse the overlapping area while switching signals and retaining network access.

Figure 1D:
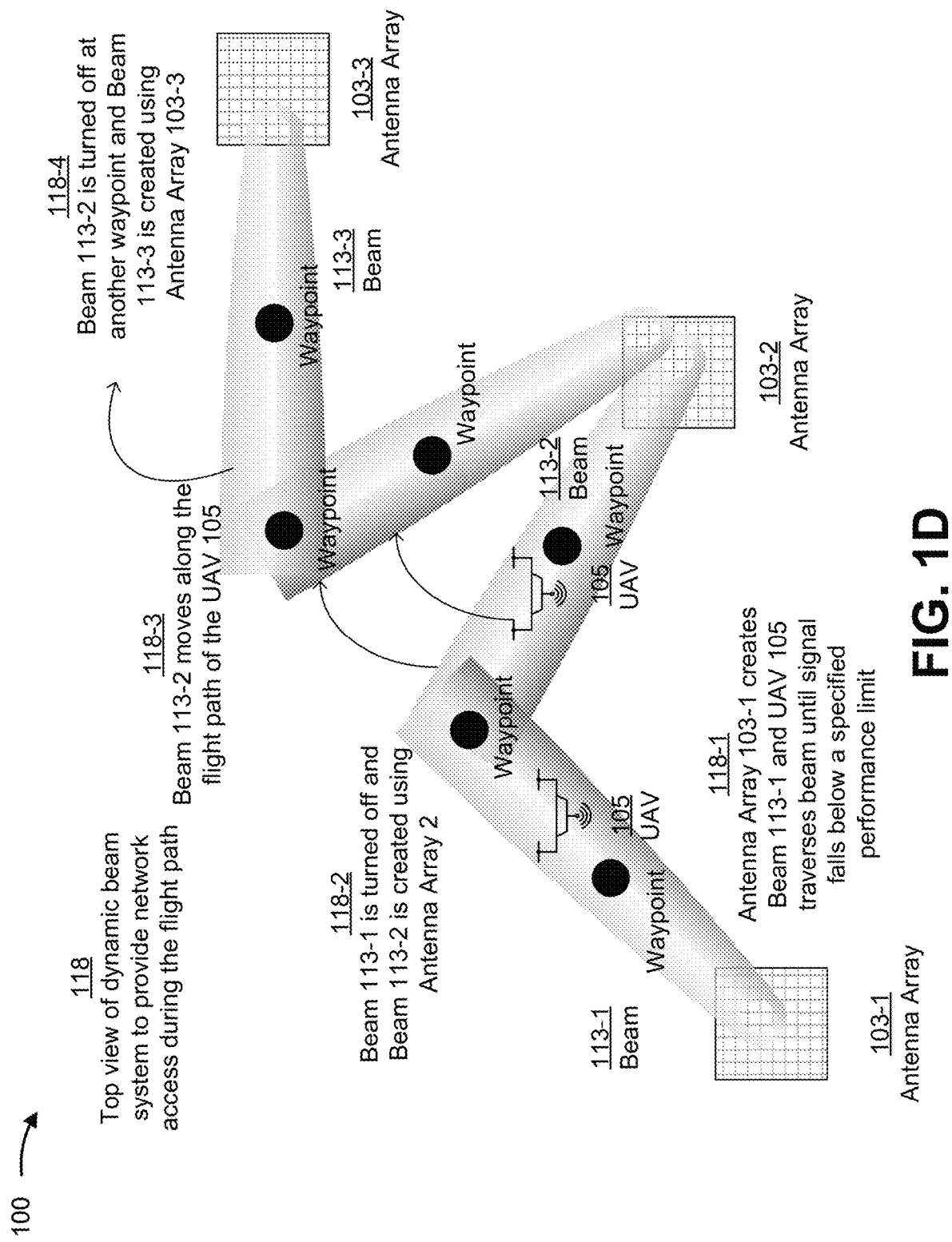

As shown in FIG. 1D, and by reference number 118, the control information may result in a dynamic beam system to provide network access to the UAV 105 during the flight path. This allows for flexibility in establishing network access for a flight path where only using static beams may be insufficient to provide network access throughout the entire duration of the flight. This may allow for more efficient resource allocation, as fewer antenna arrays may be used to create a flight path with network access for a flight of a UAV, or allow for multiple UAVs to traverse different flight paths using the plurality of antenna arrays because of the different flight paths that may be created through the flexibility of dynamic beams.

For the example of FIG. 1D, assume that antenna array 103-1 provides a beam 113-1 that is static, in that the beam 113-1 does not move during a time that the beam 113-1 is active; antenna array 103-2 provides a beam 113-2 that is dynamic, in that the beam 113-2 is capable of being steered during a time that the beam 113-2 is active; and antenna array 103-3 provides a beam 113-2 that is dynamic, in that the beam 113-2 is capable of being steered during the time that the beam 113-3 is active.

As shown in FIG. 1D, and by reference number 118-1, antenna array 103-1 may create the beam 113-1. The UAV 105 may traverse the length of the beam 113-1 (e.g., from a first waypoint toward a second waypoint) until the signal falls below a specified performance limit.

As shown in FIG. 1D, and by reference number 118-2, the antenna array 103-1 may be configured to turn off the beam 113-1 while the antenna array 103-2 may create the beam 113-2 when the UAV 105 reaches a particular waypoint. In some implementations, the antenna array 103-1 may be configured to turn off the beam 113-1 based on previous calculations of whether the UAV 105 is in proximity of another stronger signal. For example, the antenna array 103-1 may be configured to turn off the beam 113-1 based on a time that was calculated based on the UAV 105's aerial capabilities (e.g., speed, velocity, acceleration, and/or the like) to traverse an approximate length of the beam 113-1. Additionally, or alternatively, the UAV 105 may send location coordinates of the UAV 105 periodically to indicate when the UAV 105 is in proximity of another antenna array that may provide a stronger signal. This provides a "handoff" mechanism, in which the UAV 105 may traverse a beam until the signal falls below a specified performance limit and switch signals to another beam that may be formed. The antenna array 103-1 may keep the beam 113-1 active for a period while the handover mechanism occurs to ensure that the signal is not lost at the waypoint.

As shown in FIG. 1D, and by reference number 118-3, the antenna array 103-2 may sweep the beam along the flight path of the UAV 105, such that the UAV 105 remains in an aerial corridor created by the beam 113-2 and retains network access while traversing waypoints. The UAV 105 may traverse from waypoint to waypoint, while the antenna array 103-2 sweeps the beam from waypoint to waypoint in pace with the UAV 105. The antenna array 103-2 may redirect the beam 113-2 according to previous calculations, as described above, by real-time tracking of the UAV 105, as described above, a combination of the two methods, and/or the like.

As shown in FIG. 1D, and by reference number 118-4, the antenna array 103-3 may create a new beam 113-3 and the antenna array 103-2 may turn off the beam 113-2 when the UAV 105 arrives at another waypoint. This is similar to the handoff mechanism described above between the beam 113-1 and beam 113-2. The handoff mechanism may occur through any number of beams, including any number or combination of static beams or dynamic beams. Accordingly, the aerial corridor management platform 101 may use static beams, dynamic beams, or a combination of static beams and dynamic beams to create aerial corridors for the flight path. This may permit the UAV 105 to traverse from waypoint to waypoint while maintaining network access.

Figure 1E:
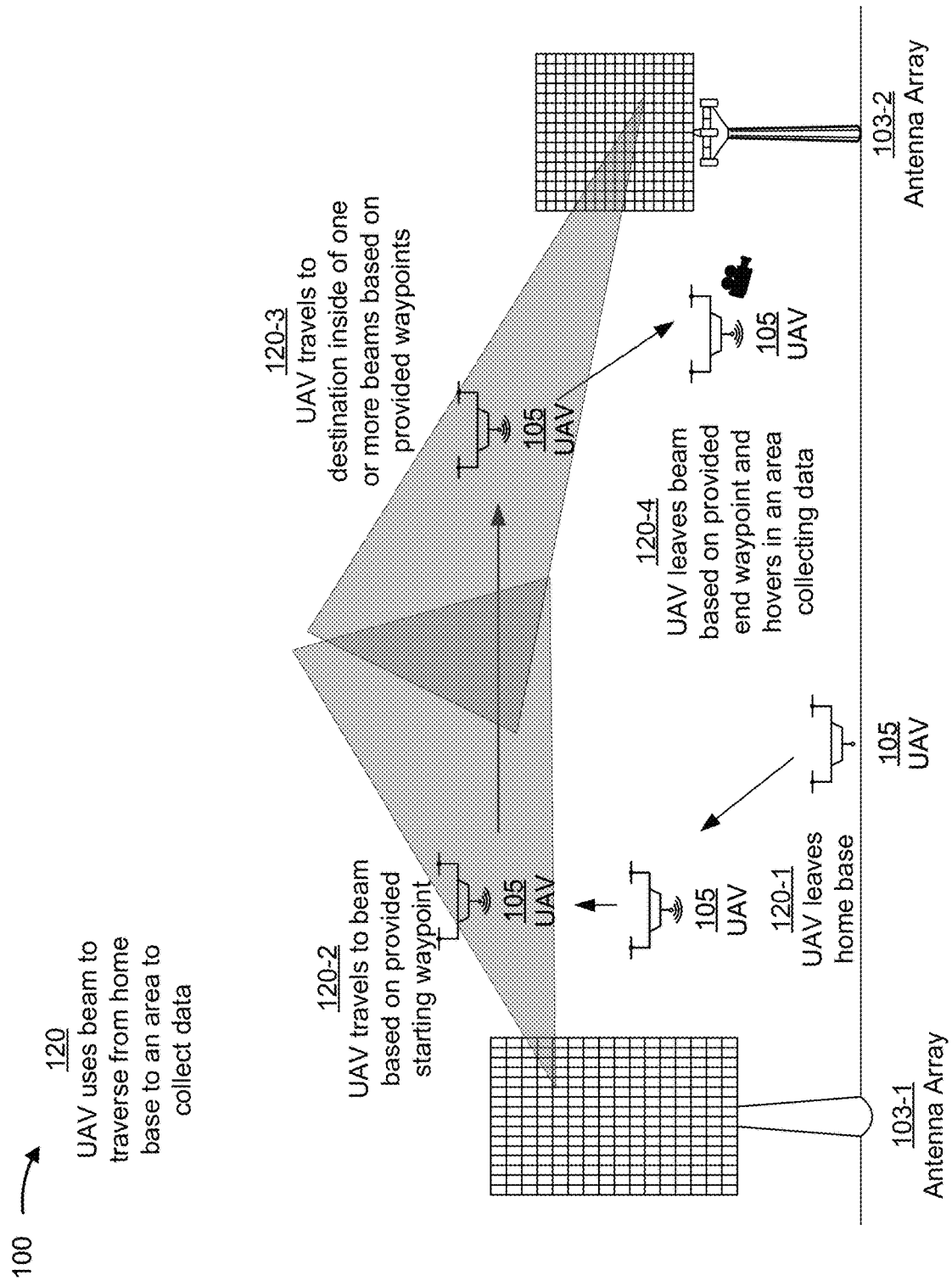

As shown in FIG. 1E, and by reference number 120, the UAV 105 may navigate the waypoints using one or more beams to traverse from a home base to a destination location to collect data. As shown in FIG. 1E, and by reference number 120-1, the UAV 105 may leave the home base to a provided starting waypoint. The UAV 105 may be caused to leave the home base by remote control, autonomously through a predetermined flight path, and/or the like. The UAV 105 may be initially connected to a network via a signal from a terrestrial antenna array, such as a phased array antenna or an antenna directed toward terrestrial devices. As shown in FIG. 1E, and by reference number 120-2, UAV 105 may travel to a first beam location based on the provided starting waypoint. The antenna array 103-1 may be configured to activate the first beam based on previous calculations of when the UAV 105 is to reach the starting waypoint, the antenna array having already activated the first beam before the UAV 105 has reached the starting waypoint, real-time tracking of the UAV 105, and/or the like.

As shown in FIG. 1E, and by reference number 120-3, the UAV 105 may travel to a destination inside of one or more beams based on provided waypoints. In some implementations, the UAV 105 may travel to the destination location, while maintaining network access, using only one beam, whether static or dynamic. In some implementations, the UAV 105 may travel to the destination location, while maintaining network access, using two or more beams, using the handoff mechanism described with regard to FIG. 1D, and using any combination of static or dynamic beams.

As shown in FIG. 1E, and by reference number 120-4, the UAV 105 may leave the one or more beams based on a provided end waypoint and perform an action based on a service the UAV 105 is configured to provide. For example, the UAV 105 may leave the one or more beams and hover in an area to collect data (e.g., photos, videos, measurements, and/or the like). The UAV 105 may be configured to return to the home base via the waypoints in reverse order, or may be configured to send another set of one or more conditions, such as a case when the UAV 105 has an additional destination location for which a new set of waypoints are needed.

The previous description describes an example use case of aerial corridors to be used for a particular UAV service (e.g., a UAV travelling to a destination location to collect data). The previous description may be used for other services to be provided by UAVs, may be used for multiple UAVs, and/or the like.

As shown in FIG. 1F, and by reference number 122, the UAV 105 may use one or more beams to traverse from a home base to an area to collect data and then return to a beam, of the one or more beams, as needed for network access. The beam, of the one or more beams, may be left active for the UAV 105 to be able to return to in order to upload cached content, download cached content, or perform another service which requires network access.

As shown in FIG. 1F, and by reference number 122-1, the UAV 105 may leave a home base. Similarly to what was described with regard to FIG. 1E, the UAV 105 may leave the home base to a provided starting waypoint. The UAV 105 may be caused to leave the home base by remote control, or autonomously through a predetermined flight path.

As shown in FIG. 1F, and by reference number 122-2, the UAV 105 may travel to a first beam based on a provided starting waypoint. As shown in FIG. 1F, and by reference number 122-3, the UAV 105 may travel to a destination area inside of one or more beams based on provided waypoints. In some implementations, the UAV 105 may travel to the destination area, while maintaining network access, using only one beam, whether static or dynamic. In some implementations, the UAV 105 may travel to the destination area, while maintaining network access, using two or more beams, using the handoff mechanism described with regard to FIG. 1D, and using any combination of static or dynamic beams.

As shown in FIG. 1F, and by reference number 122-4, UAV 105 may leave the one or more beams based on a provided end waypoint to collect data or perform another service. As shown in FIG. 1F, and by reference number 122-5, UAV 105 may return to a beam, of the one or more beams, to upload or download cached content, or to perform another service which prefers or requires network access. In some implementations, the UAV 105 may be caused to return to the beam as another waypoint in the flight path. Additionally, or alternatively, the UAV 105 may have location coordinates, stored in memory, where the beam is active (e.g., location coordinates of waypoints associated with the flight path). The UAV 105 may be caused to return to the beam based on remote control or based on an autonomous function that causes the UAV 105 to return to a beam (e.g., a waypoint associated with a beam) once a threshold of cached content has been gathered.

The previous embodiment describes an example use case of aerial corridors to be used to enable a UAV 105 to return to one or more beams to obtain network access. The previous embodiment may be used for other services to be provided by UAVs, may be used for multiple UAVs, and/or the like. Additionally, or alternatively, while the previous embodiment described the UAV 105 returning to the beam after reaching the destination area, the UAV 105 may leave the one or more beams at other points in the flight path, and return to the one or more beams to regain network access and/or traverse the remainder of the flight path.

As shown in FIG. 1G, and by reference number 124, multiple UAVs 105 may operate together to collect data. As shown in FIG. 1G, and by reference number 124-1, a first UAV (e.g., UAV 105-1) may stay within an aerial corridor created by a beam. A second UAV (e.g., UAV 105-2) may stay outside of the aerial corridor created by the beam and gather data. The UAVs 105 (collectively UAV 105-1 and UAV 105-2) may send data to each other through a first communication channel (e.g., a sidelink communication channel), while UAV 105-1 maintains network access to a network using a second communication channel (e.g., an uplink communication channel and/or a downlink communication channel). The UAVs 105 may traverse one or more beams while remaining paired to each other via the first communication channel. For example, the UAV 105-1 may traverse one or more beams using the handover mechanism described in FIG. 1D, while the UAV 105-2 may stay within communication range to retain a connection with UAV 105-1 via the first communication channel. Data collected by UAV 105-2 may be uploaded to the network despite the UAV 105-2 not being within range of the beam, because of the connection maintained with the UAV 105-1. In this way, there is additional flexibility in collecting data and uploading data with network access. For example, if a UAV needs network access but is in a suboptimal area for a beam to reach, the additional UAV and separate communication channel may still allow the UAV to maintain network access in the suboptimal area.

FIGS. 1D-1G describe several embodiments and/or use cases of aerial corridors. In practice, aerial corridors may be used for any single one of the use cases described above, a different use case, a combination of use cases, and/or the like. For example, multiple UAVs may simultaneously use the aerial corridors to provide different services.

Figure 1H:
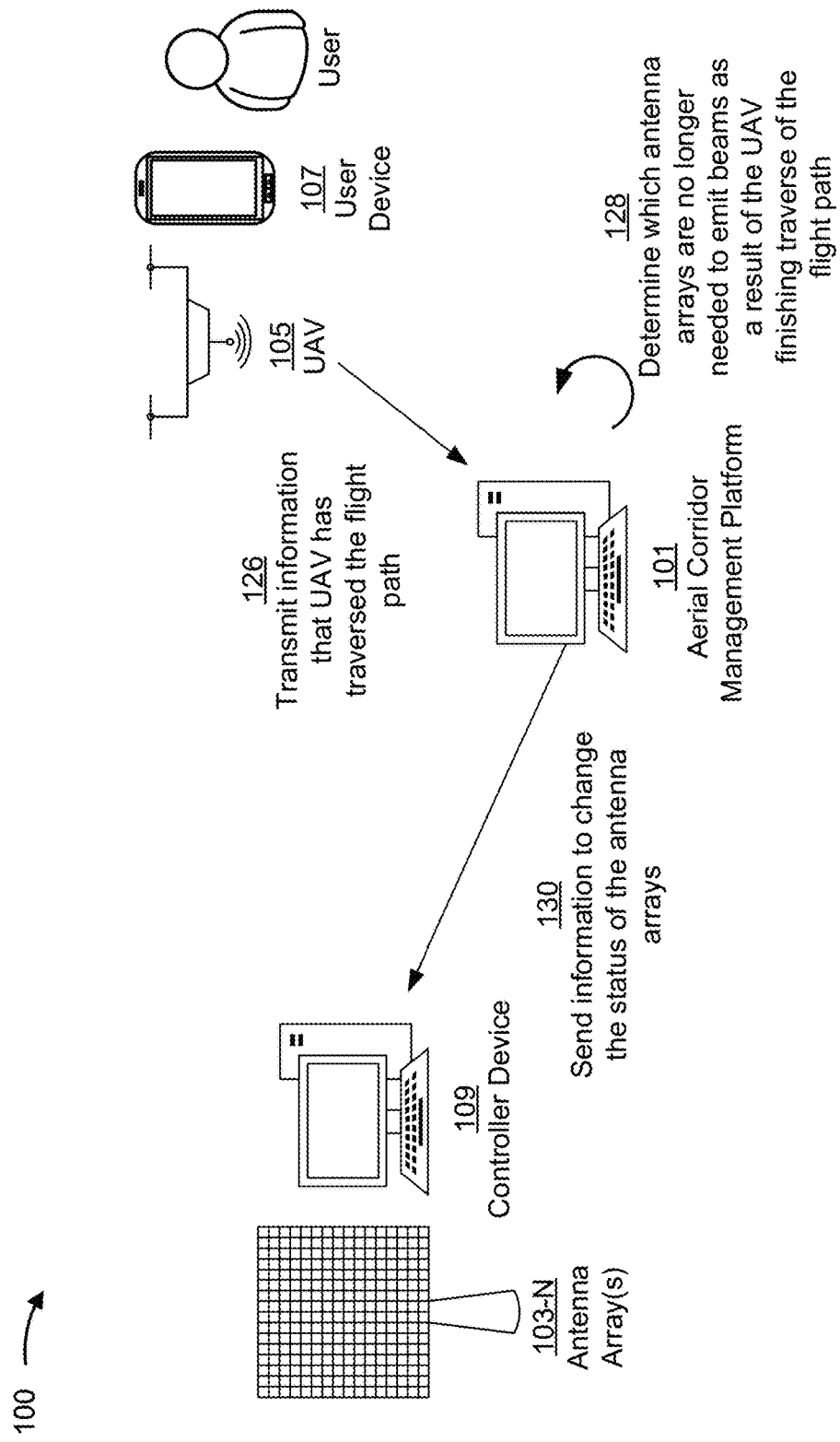

As shown in FIG. 1H, and by reference number 126, the UAV 105 may transmit information to the aerial corridor management platform 101 that the UAV 105 has traversed the waypoints for the flight path. The aerial corridor management platform 101 may use this information to update the aerial corridor management platform 101 with new information regarding which beams are to stay active, are to be made inactive, and/or the like. In some implementations, as described above, the UAV 105 may transmit information to the aerial corridor management platform 101 as the UAV 105 is traversing the flight path. The aerial corridor management platform 101 may use this information to track the UAV 105 and control one or more of the antenna arrays 103.

As shown in FIG. 1H, and by reference number 128, the aerial corridor management platform 101 may determine which antenna arrays are no longer needed to emit beams as a result of the UAV 105 finishing the flight path (or as the UAV 105 is traversing the flight path). For example, the aerial corridor management platform 101 may determine that the one or more antenna arrays used in the flight path of the UAV 105 are no longer needed to emit beams. In some implementations, where there are multiple UAVs traversing a similar flight path, the aerial corridor management platform 101 may determine that the one or more antenna arrays used in the flight path of the UAV 105 still need to emit beams. In some implementations, where the UAV 105 has left the flight path, but will return to a beam, of the one or more beams, for network access, the aerial corridor management platform 101 may determine that only some antenna arrays 103 are no longer needed to emit beams as a result of the UAV 105 leaving the flight path.

As shown in FIG. 1H, and by reference number 130, the aerial corridor management platform 101 may send information to change the status of the antenna arrays 103 to controller device 109. For example, the aerial corridor management platform 101 may send instructions to turn the one or more antenna arrays 103-N to inactive mode based on the one or more antenna arrays 103-N no longer being needed to emit a signal for the UAV 105 to have network access during the flight path, because the flight path has been completed. In some implementations, the aerial corridor management platform 101 may send instructions to turn only some of the one or more antenna arrays 103-N to inactive mode if other UAVs may need network access. In some implementations, the aerial corridor management platform 101 may send updated control information to the one or more antenna arrays 103-N to vary the strength of one or more beams in accordance with any remaining UAVs that may be using the beams as aerial corridors for network access.

While the previous descriptions mainly illustrate example use cases with a single UAV 105 and multiple antenna arrays 103, it is to be understood, that the aerial corridor management platform 101 may be used to create aerial corridors with a great number of UAVs and antenna arrays. In this way, the aerial corridor management platform 101 may provide reliable licensed wireless connectivity for UAVs. This may isolate UAV traffic from terrestrial network traffic, thereby reducing uplink interference and computing resources used to remedy interference. Additionally, or alternatively, the dynamic nature of the aerial corridors may prevent cell site spoofing, thereby enhancing security of the UAV. In this way, implementations described herein may save computing resources (e.g., processor resources, memory resources, communication resources, and/or the like) that would otherwise have been used in attempting to identify, diagnose, and remedy security threats caused by cell site spoofing. For example, computing resources that may otherwise have been used in executing additional processes to identify a cause of the security breach or remedy the security breach (e.g., resetting a system, recovering data, obtaining new data, and/or the like) may no longer be used, because of the reduction or elimination of security breaches.

As indicated above, FIGS. 1A-1H are provided as examples. Other examples can differ from what is described with regard to FIGS. 1A-1H.

Figure 2:
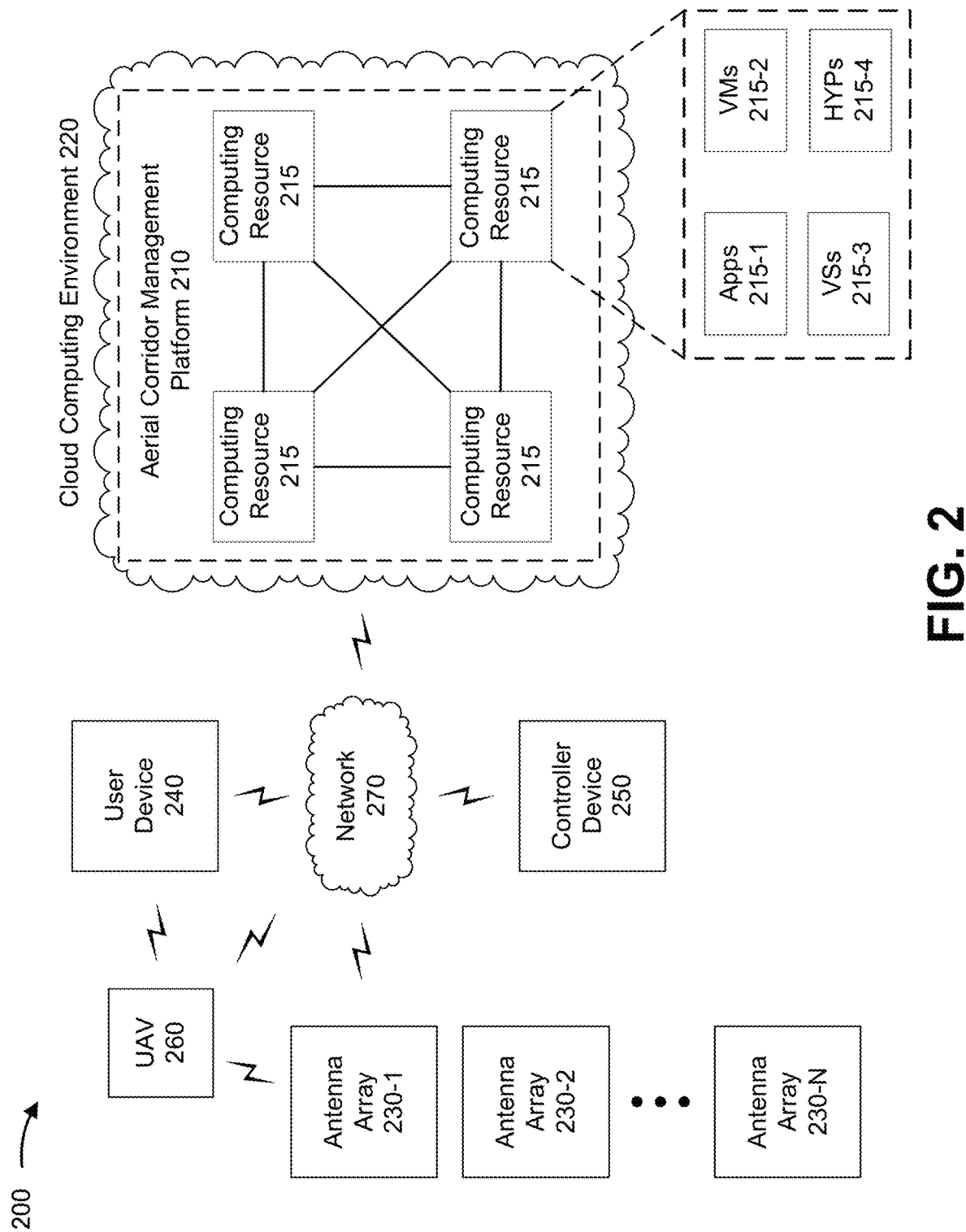
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include an aerial corridor management platform 210 implemented in a cloud computing environment 220, antenna arrays 230 (shown as antenna arrays 230-1 to 230-N, and referred to individually as antenna array 230 and collectively antenna arrays 230), a user device 240, a controller device 250, an unmanned aerial vehicle (UAV) 260, and network 270. Devices of environment 200 may interconnect via wired connections, wireless connections, or a combination of wired and wireless connections.

Aerial corridor management platform 210 includes one or more devices capable of sending, receiving, generating, storing, processing, and/or providing information associated with creating aerial corridors for aerial vehicles. For example, aerial corridor management platform 210 may be a platform implemented by cloud computing environment 220 that may send, and/or receive information regarding flight path information to generate a set of waypoints for a flight path of a UAV 260 that allows network access throughout the duration of the flight path. In some implementations, aerial corridor management platform 210 is implemented by computing resources 215 of cloud computing environment 220. Aerial corridor management platform 210 may correspond to aerial corridor management platform 101 as described with regard to FIGS. 1A-1H.

While the example environment 200 indicates that aerial corridor management platform 210 is implemented in a cloud computing environment 220, in some implementations, aerial corridor management platform 210 may be implemented by one or more devices outside of a cloud computing environment, such as a server device, a data center device, and/or the like. In some implementations, aerial corridor management platform 210 may be implemented using at least one cloud-based device and at least one non-cloud-based device.

Cloud computing environment 220 includes an environment that delivers computing as a service, whereby shared resources, services, and/or the like may be provided to aerial corridor management platform 210 for allowing UAVs to maintain network access throughout a flight path. Cloud computing environment 220 may provide computation, software, data access, storage, and/or other services that do not require end-user knowledge of a physical location and configuration of a system and/or a device that delivers the services. As shown, cloud computing environment 220 may include aerial corridor management platform 210 and computing resources 215.

Computing resource 215 includes one or more personal computers, workstation computers, server devices, or another type of computation and/or communication device. In some implementations, computing resource 215 may host aerial corridor management platform 210. The cloud resources may include compute instances executing in computing resource 215, storage devices provided in computing resource 215, data transfer devices provided by computing resource 215, etc. In some implementations, computing resource 215 may communicate with other computing resources 215 via wired connections, wireless connections, or a combination of wired and wireless connections.

As further shown in FIG. 2, computing resource 215 may include a group of cloud resources, such as one or more applications ("APPs") 215-1, one or more virtual machines ("VMs") 215-2, virtualized storage ("VSs") 215-3, one or more hypervisors ("HYPs") 215-4, or the like.

Application 215-1 includes one or more software applications that may be provided to or accessed aerial corridor management platform 210. Application 215-1 may eliminate a need to install and execute the software applications on aerial corridor management platform 210, and/or the like. For example, application 215-1 may include software associated with aerial corridor management platform 210 and/or any other software capable of being provided via cloud computing environment 220. In some implementations, one application 215-1 may send/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system ("OS"). A process virtual machine may execute a single program, and may support a single process. In some implementations, virtual machine 215-2 may execute on behalf of a user (e.g., user device 240, etc.), and may manage infrastructure of cloud computing environment 220, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 215-4 provides hardware virtualization techniques that allow multiple operating systems (e.g., "guest operating systems") to execute concurrently on a host computer, such as computing resource 215. Hypervisor 215-4 may present a virtual operating platform to the guest operating systems, and may manage the execution of the guest operating systems. Multiple instances of a variety of operating systems may share virtualized hardware resources.

Antenna array 230 includes one or more devices capable of transferring traffic, such as audio, video, text, and/or other traffic, destined for and/or received from user device 240, controller device 250, and/or UAV 260. Antenna array 230 may include, or be associated with, a baseband unit (e.g., including a control unit, a first processor for handling backhaul load traffic, a second processor for handling access load traffic, etc.) and one or more radio head units (e.g., including one or more antenna arrays for performing massive MIMO). In some implementations, antenna array 230 may include, or be associated with, an Evolved Node B (eNB). Antenna array 230 may support one or more radio access technologies (RATs) or radio transmission technologies, such as a 5G RAT, an LTE RAT, a universal mobile telecommunications system (UMTS) RAT, a global system for mobile communication (GSM) RAT, a microwave (MVV), and/or the like. Antenna array 230 may correspond to antenna array 103 as described with regard to FIGS. 1A-1H.

In some implementations, antenna array 230 may communicate with (e.g., send traffic to and/or receive traffic from) controller device 250 and/or network 270 via a wired connection, such as a fiber optic cable. Additionally, or alternatively, antenna array 230 may send traffic to and/or receive traffic from user device 240 and/or UAV 260 via an air interface (e.g., using one or more access beams).

In some implementations, antenna array 230 may change a direction and/or a signal strength of one or more beams using the baseband unit and the one or more radio head units. For example, the control unit of the baseband unit may change the direction and/or the signal strength of the one or more beams by sending beamforming parameters. The beamforming parameters may define a beam direction and/or a beam width (e.g., by indicating a particular value for a phase and/or an amplitude of a signal). In this case, the beamforming parameters may be used to instruct the radio head unit to configure one or more antenna arrays 230 based on the beamforming parameters. Here, the radio head unit may receive beamforming parameters requesting to modify the amplitude and/or the phase of the one or more beams, and the modification may cause the one or more beams to change direction.

User device 240 includes one or more devices capable of communicating with aerial corridor management platform 210 and/or UAV 260. For example, user device 240 may include a wireless communication device, a radiotelephone, a smart phone, a wearable device (e.g., smart glasses or a smart watch), a laptop computer, a tablet computer, a personal gaming system, a machine-type communication device (e.g., an Internet of Things device, a machine-to-machine device, etc.), and/or a similar device. User device 240 may transmit traffic to and/or receive traffic from antenna array 230 (e.g., using an access beam). User device 240 may correspond to user device 107 as described with regard to FIGS. 1A-1H.

Controller device 250 includes one or more devices capable of communicating with aerial corridor management platform 210 and/or antenna arrays 230. For example, controller device 250 may include a server device, a controller device, and/or the like. Controller device 250 may be configured to control a single antenna array 230 or a plurality of antenna arrays 230. Controller device 250 may send instructions to one or more antenna arrays 230 to change a direction and/or a signal strength of one or more beams using the baseband unit and the one or more radio head units. Controller device 250 may correspond to control device 109 as described with regard to FIGS. 1A-1H.

UAV 260 includes an autonomous aerial vehicle capable of autonomous flight and receiving, generating, storing, transmitting, processing, and/or providing information associated with traversing a flight path to perform a service. For example, UAV 260 may include an aerial vehicular device equipped with communication and/or computing equipment, such as an unmanned aerial vehicle (e.g., a drone, a quadcopter, etc.), and/or the like. In some implementations, UAV 260 may include an aircraft that has an area for at least one human passenger but is unmanned by way of the control of the aircraft being autonomous and not performed by a human. UAV 260 may correspond to UAV 105 as described with regard to FIGS. 1A-1H.

UAV 260 may include one or more sensors configured to determine the location and/or route of the UAV 260 for navigating UAV 260 to perform a service. For example, UAV 260 may include Global Navigation Satellite System (GNSS) receivers, including receivers for GPS, GLONASS, Galileo, BeiDou, and/or other satellite systems. UAV 260 may be programmed with travel routes, coordinates, and/or the like.

Network 270 includes one or more wired and/or wireless networks. For example, network 270 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
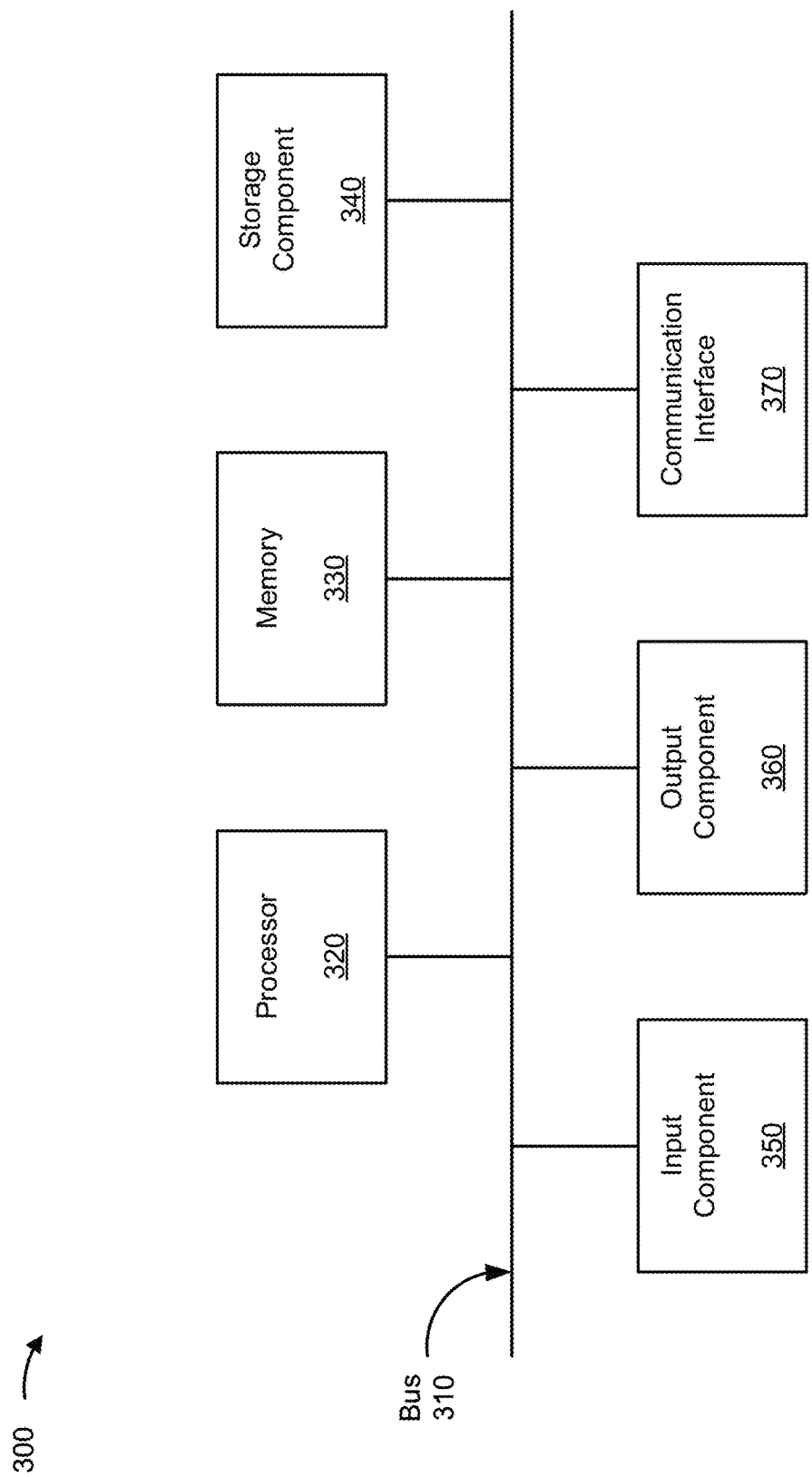
FIG. 3 is a diagram of example components of one or more devices of FIG. 2.

FIG. 3 is a diagram of example components of a device 300. Device 300 may correspond to aerial corridor management platform 210, antenna array 230, user device 240, controller device 250, and/or UAV 260. In some implementations, aerial corridor management platform 210, antenna array 230, user device 240, controller device 250, and/or UAV 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
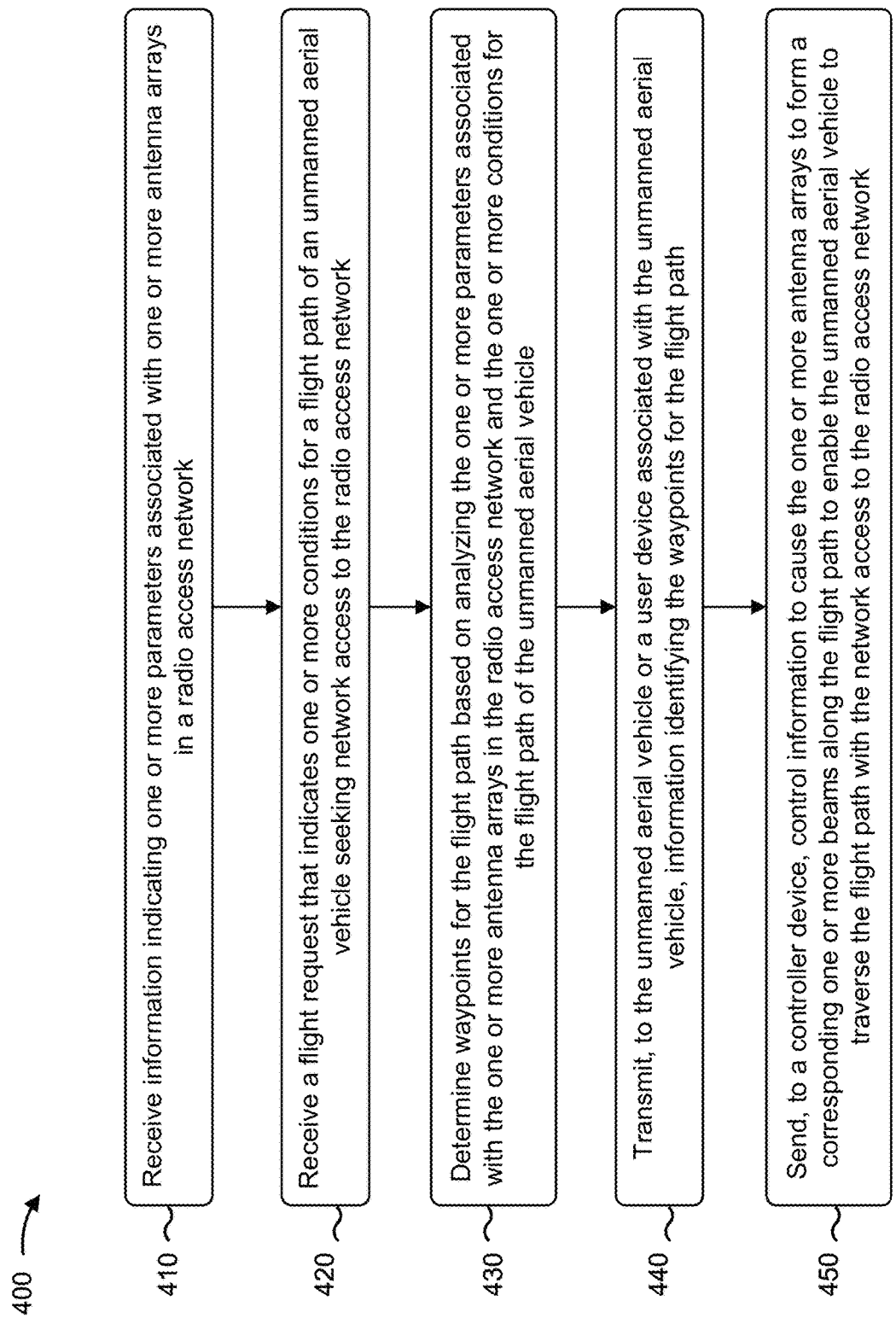
FIG. 4 is a flow chart of an example process for systems and methods for creating aerial traffic corridors.

FIG. 4 is a flow chart of an example process 400 for systems and methods for creating aerial traffic corridors. In some implementations, one or more process blocks of FIG. 4 may be performed by a device (e.g., aerial corridor management platform 210). In some implementations, one or more process blocks of FIG. 4 may be performed by another device or a group of devices separate from or including the device, such as an antenna array (e.g., antenna array 230), a user device (e.g., user device 240), a controller device (e.g., controller device 250), a UAV (e.g., UAV 260) and/or the like.

As shown in FIG. 4, process 400 may include receiving information indicating one or more parameters associated with one or more antenna arrays in a radio access network (block 410). For example, the device (e.g., using computing resource 215, processor 320, memory 330, storage component 340, input component 350, output component 360, communication interface 370, and/or the like) may receive information indicating one or more parameters associated with one or more antenna arrays in a radio access network, as described above. In some implementations, the one or more parameters associated with the one or more antenna arrays comprise one or more of: information indicating a geographic location of an antenna array of the one or more antenna arrays, information indicating a possible orientation of an antenna array of the one or more antenna arrays, information indicating an availability of an antenna array of the one or more antenna arrays, information indicating a power of a signal capable of being output by an antenna array of the one or more antenna arrays, information indicating an altitude of an antenna array of the one or more antenna arrays, information indicating a size of an antenna array of the one or more antenna arrays, or information indicating a beam capability of an antenna array of the one or more antenna arrays. In some implementations, process 400, when receiving the information indicating the one or more parameters, may include receiving the information indicating the one or more parameters based on receiving the flight request.

As further shown in FIG. 4, process 400 may include receiving a flight request that indicates one or more conditions for a flight path of an unmanned aerial vehicle seeking network access to the radio access network (block 420). For example, the device (e.g., using computing resource 215, processor 320, memory 330, storage component 340, input component 350, output component 360, communication interface 370, and/or the like) may receive a flight request that indicates one or more conditions for a flight path of an unmanned aerial vehicle seeking network access to the radio access network, as described above. In some implementations, the one or more conditions for the flight path of the unmanned aerial vehicle comprise one or more of: a minimum signal-to-interference-plus-noise ratio for the network access to the radio access network, a minimum desired throughput for the network access to the radio access network, a description of a service associated with the unmanned aerial vehicle, information identifying a start location for the flight path, information identifying an end location for the flight path, a maximum altitude associated with the flight path, a minimum altitude associated with the flight path, a maximum route distance that the unmanned aerial vehicle is capable of travelling, or an energy expenditure preference of the unmanned aerial vehicle. In some implementations, the flight request may further include information indicating that a condition, of the one or more conditions, is one of: an optional condition, a preferred condition, or a necessary condition.

As further shown in FIG. 4, process 400 may include determining waypoints for the flight path based on analyzing the one or more parameters associated with the one or more antenna arrays in the radio access network and the one or more conditions for the flight path of the unmanned aerial vehicle (block 430). For example, the device (e.g., using computing resource 215, processor 320, memory 330, storage component 340, input component 350, output component 360, communication interface 370, and/or the like) may determine waypoints for the flight path based on analyzing the one or more parameters associated with the one or more antenna arrays in the radio access network and the one or more conditions for the flight path of the unmanned aerial vehicle, as described above. In some implementations, determining the waypoints for the flight path comprises using machine learning to determine the waypoints for the flight path. In some implementations, determining the waypoints for the flight path comprises determining the waypoints for the flight path such that the one or more conditions are satisfied. In some implementations, process 400, when determining the waypoints for the flight path, may include determining that one or more parts of the flight path where the network access in the radio access network is unnecessary. In some implementations, process 400, when determining the waypoints for the flight path, may include obtaining a machine learning model that was trained to determine a plurality of waypoints based on historical information regarding a plurality of flight paths, the one or more antenna arrays, and a plurality of flight paths, and using the machine learning model to determine the waypoints based on the one or more parameters associated with the one or more antenna arrays and the one or more conditions for the flight path of the unmanned aerial vehicle. In some implementations, process 400, when determining the waypoints for the flight path, may include determining the waypoints for the flight path such that if all of the one or more conditions cannot be satisfied, using machine learning to determine which conditions, of the one or more conditions, should be satisfied. In some implementations, process 400 may include obtaining an update to the one or more parameters associated with an antenna array, of the one or more antenna arrays, that is geographically closest to a start point of the flight path, where at least one of the waypoints is to be determined based on the one or more parameters after the one or more parameters are updated.

As further shown in FIG. 4, process 400 may include transmitting, to the unmanned aerial vehicle or a user device associated with the unmanned aerial vehicle, information identifying the waypoints for the flight path (block 440). For example, the device (e.g., using computing resource 215, processor 320, memory 330, storage component 340, input component 350, output component 360, communication interface 370, and/or the like) may transmit, to the unmanned aerial vehicle or a user device associated with the unmanned aerial vehicle, information identifying the waypoints for the flight path, as described above. In some implementations, transmitting the information identifying the waypoints for the flight path includes transmitting instructions to cause the unmanned aerial vehicle to traverse the flight path via the waypoints for the flight path. In some implementations, process 400, when transmitting the information identifying the waypoints for the flight path, may include: transmitting a notification that a condition, of the one or more conditions, was not satisfied; transmitting a request to accept or reject a set of waypoints for the flight path without all of the one or more conditions being satisfied; and performing one or more actions based on a response to the request to accept or reject the set of waypoints for the flight path without all of the one or more conditions being satisfied. In some implementations, process 400 may further include transmitting, to the unmanned aerial vehicle or a user device associated with the unmanned aerial vehicle, information regarding a second unmanned aerial vehicle traversing another flight path that coincides with the flight path for the unmanned aerial vehicle.

As further shown in FIG. 4, process 400 may include sending, to a controller device, control information to cause the one or more antenna arrays to form a corresponding one or more beams along the flight path to enable the unmanned aerial vehicle to traverse the flight path with the network access to the radio access network (block 450). For example, the device (e.g., using computing resource 215, processor 320, memory 330, storage component 340, input component 350, output component 360, communication interface 370, and/or the like) may send, to a controller device, control information to cause the one or more antenna arrays to form a corresponding one or more beams along the flight path to enable the unmanned aerial vehicle to traverse the flight path with the network access to the radio access network, as described above. In some implementations, the control information comprises one or more instructions to: vary a height of a beam of the one or more beams, vary a sweep of a beam of the one or more beams, vary an angle of a beam of the one or more beams, vary a width for a beam of the one or more beams, or vary a duration that a beam, of the one or more beams, is active. In some implementations, the control information may cause the one or more antenna arrays to form the corresponding one or more beams with a gain that satisfies a threshold. In some implementations, the control information may cause a set of beams, of the one or more beams, to vary to allow the unmanned aerial vehicle to traverse an area accessible by the set of beams while maintaining the network access to the radio access network.

Process 400 may include additional implementations, such as any single implementation or any combination of implementations described above and/or in connection with one or more other processes described elsewhere herein.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, information indicating one or more parameters associated with one or more antenna arrays in a radio access network;
   receiving, by the device, a flight request that indicates one or more conditions for a flight path of an unmanned aerial vehicle (UAV) seeking network access to the radio access network;
   determining, by the device, waypoints for the flight path based on analyzing the one or more parameters associated with the one or more antenna arrays in the radio access network and the one or more conditions for the flight path of the UAV;
   transmitting, by the device, information identifying the waypoints for the flight path; and
   sending, by the device, control information to cause the one or more antenna arrays to form a corresponding one or more beams along the flight path to enable the UAV to traverse the flight path with the network access to the radio access network,
   wherein the UAV is to traverse the flight path by traveling within a corridor created by the one or more beams.

2. The method of claim 1, wherein transmitting the information identifying the waypoints for the flight path includes transmitting instructions to cause the UAV to traverse the flight path via the waypoints for the flight path.

3. The method of claim 1, wherein the one or more parameters associated with the one or more antenna arrays comprise one or more of:
   information indicating a geographic location of an antenna array of the one or more antenna arrays,
   information indicating a possible orientation of an antenna array of the one or more antenna arrays,
   information indicating an availability of an antenna array of the one or more antenna arrays,
   information indicating a power of a signal capable of being output by an antenna array of the one or more antenna arrays,
   information indicating an altitude of an antenna array of the one or more antenna arrays,
   information indicating a size of an antenna array of the one or more antenna arrays, or
   information indicating a beam capability of an antenna array of the one or more antenna arrays.

4. The method of claim 1, wherein the one or more conditions for the flight path of the unmanned aerial vehicle comprise one or more of:
   a minimum signal-to-interference-plus-noise ratio for the network access to the radio access network,
   a minimum desired throughput for the network access to the radio access network,
   a description of a service associated with the unmanned aerial vehicle,
   information identifying a start location for the flight path,
   information identifying an end location for the flight path,
   a maximum altitude associated with the flight path,
   a minimum altitude associated with the flight path,
   a maximum route distance that the UAV is capable of travelling, or
   an energy expenditure preference of the UAV.

5. The method of claim 1, wherein the control information comprises one or more instructions to:
   vary a height of a beam of the one or more beams,
   vary a sweep of a beam of the one or more beams,
   vary an angle of a beam of the one or more beams,
   vary a width for a beam of the one or more beams, or
   vary a duration that a beam, of the one or more beams, is active.

6. The method of claim 1, wherein receiving the flight request that indicates one or more conditions for the flight path of the UAV path comprises using machine learning to determine additional conditions for the flight path.

7. The method of claim 1, wherein determining the waypoints for the flight path comprises determining the waypoints for the flight path such that the one or more conditions are satisfied.

8. A device, comprising:
   one or more memories; and
   one or more processors, communicatively coupled to the one or more memories, configured to:
      receive information indicating one or more parameters associated with one or more antenna arrays in a radio access network;
      receive a flight request that indicates one or more conditions for a flight path of an unmanned aerial vehicle (UAV) seeking network access to the radio access network;
      determine waypoints for the flight path based on analyzing the one or more parameters associated with the one or more antenna arrays in the radio access network and the one or more conditions for the flight path of the UAV; and
      transmit information identifying the waypoints for the flight path to permit the UAV to traverse the flight path via the waypoints,
         wherein information identifying the waypoints enables the UAV to traverse the flight path by traveling within a corridor created by one or more beams formed by the one or more antenna arrays.

9. The device of claim 8, wherein the one or more processors, when receiving the information indicating the one or more parameters, are to:
   receive the information indicating the one or more parameters based on receiving the flight request.

10. The device of claim 8, wherein the flight request further includes information indicating that a condition, of the one or more conditions, is one of:
    an optional condition,
    a preferred condition, or
    a necessary condition.

11. The device of claim 8, wherein the one or more processors, when determining the waypoints for the flight path, are to:
    determine one or more parts of the flight path where the network access in the radio access network is unnecessary.

12. The device of claim 8, wherein the one or more processors, when transmitting the information identifying the waypoints for the flight path, are to:
    transmit a notification that a condition, of the one or more conditions, was not satisfied,
    transmit a request to accept or reject a set of waypoints for the flight path without all of the one or more conditions being satisfied, and
    perform one or more actions based on a response to the request to accept or reject the set of waypoints for the flight path without all of the one or more conditions being satisfied.

13. The device of claim 8, wherein the one or more processors, when determining the waypoints for the flight path, are to:
    obtain a machine learning model that was trained to determine a plurality of waypoints based on historical information regarding a plurality of flight paths, the one or more antenna arrays, and a plurality of flight paths, and
    use the machine learning model to determine the waypoints based on the one or more parameters associated with the one or more antenna arrays and the one or more conditions for the flight path of the unmanned aerial vehicle.

14. The device of claim 8, wherein the one or more processors, when determining the waypoints for the flight path, are to:
    determine the waypoints for the flight path such that if all of the one or more conditions cannot be satisfied, using machine learning to determine which conditions, of the one or more conditions, should be satisfied.

15. A non-transitory computer-readable medium storing instructions, the instructions comprising:
    one or more instructions that, when executed by one or more processors, cause the one or more processors to:
        receive information indicating one or more parameters associated with one or more antenna arrays in a radio access network;
        receive a flight request that indicates one or more conditions for a flight path of an unmanned aerial vehicle (UAV) seeking network access to the radio access network;
        determine waypoints for the flight path based on analyzing the one or more parameters associated with the one or more antenna arrays in the radio access network and the one or more conditions for the flight path of the UAV; and
        send control information to cause the one or more antenna arrays to form a corresponding one or more beams along the flight path to enable the UAV to traverse the waypoints for the flight path with the network access to the radio access network,
        wherein the UAV is to traverse the flight path by traveling within a corridor created by the one or more beams.

16. The non-transitory computer-readable medium of claim 15, wherein the one or more instructions, when executed by the one or more processors, further cause the one or more processors to:
    obtain an update to the one or more parameters associated with an antenna array, of the one or more antenna arrays, that is geographically closest to a start point of the flight path,
        wherein at least one of the waypoints is to be determined based on the one or more parameters after the one or more parameters are updated.

17. The non-transitory computer-readable medium of claim 15, wherein the control information includes an instruction to vary one or more of:
    a height of a beam of the one or more beams,
    a sweep of a beam of the one or more beams,
    an angle of a beam of the one or more beams,
    a width for a beam of the one or more beams, or
    a duration that a beam, of the one or more beams, is active.

18. The non-transitory computer-readable medium of claim 15, wherein the control information is to cause the one or more antenna arrays to form the corresponding one or more beams with a gain that satisfies a threshold.

19. The non-transitory computer-readable medium of claim 15, wherein the control information is to cause a set of beams, of the one or more beams, to vary to allow the UAV to traverse an area accessible by the set of beams while maintaining the network access to the radio access network.

20. The non-transitory computer-readable medium of claim 15, wherein the one or more instructions, when executed by the one or more processors, further cause the one or more processors to:
    transmit, to the UAV or a user device associated with the UAV, information regarding a second UAV traversing another flight path that coincides with the flight path for the UAV.

* * * * *